United States Patent
Grant et al.

(10) Patent No.: US 12,501,014 B2
(45) Date of Patent: Dec. 16, 2025

(54) AUTOMATICALLY DETERMINING EXTRINSIC PARAMETERS OF MODULAR EDGE COMPUTING DEVICES

(71) Applicant: Deere & Company, Moline, IL (US)

(72) Inventors: Elliott Grant, Woodside, CA (US);
Sergey Yaroshenko, Newark, CA (US);
Gabriella Levine, San Francisco, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/801,089

(22) Filed: Aug. 12, 2024

(65) Prior Publication Data
US 2025/0168312 A1   May 22, 2025

Related U.S. Application Data

(63) Continuation of application No. 18/223,859, filed on Jul. 19, 2023, now Pat. No. 12,063,339, which is a
(Continued)

(51) Int. Cl.
*H04N 13/239*  (2018.01)
*A01B 63/02*   (2006.01)
(Continued)

(52) U.S. Cl.
CPC .......... *H04N 13/239* (2018.05); *A01B 63/02* (2013.01); *A01B 76/00* (2013.01); *A01B 79/005* (2013.01);
(Continued)

(58) Field of Classification Search
CPC .. H04N 13/239; H04N 13/246; H04N 13/296; H04N 13/254; A01B 63/02;
(Continued)

(56) References Cited

U.S. PATENT DOCUMENTS 8,922,626 B2   12/2014   Aoki
9,325,917 B2   4/2016    Macmillan et al.
(Continued)

OTHER PUBLICATIONS

Cerfontaine et al., "Automatic Multi-Camera Setup Optimization for Optical Tracking" IEEE Virtual Reality. Mar. 2006. pp. 25-29.
(Continued)

*Primary Examiner* — Susan E. Hodges
(74) *Attorney, Agent, or Firm* — Fenwick & West LLP (57) ABSTRACT

Implementations are disclosed for automatic commissioning, configuring, calibrating, and/or coordinating sensor-equipped modular edge computing devices that are mountable on agricultural vehicles. In various implementations, neighbor modular edge computing device(s) that are mounted on a vehicle nearest a given modular edge computing device may be detected based on sensor signal(s) generated by contactless sensor(s) of the given modular edge computing device. Based on the detected neighbor modular edge computing device(s), an ordinal position of the given modular edge computing device may be determined relative to a plurality of modular edge computing devices mounted on the agricultural vehicle. Based on the sensor signal(s), distance(s) to the neighbor modular edge computing device(s) may be determined. Extrinsic parameters of the given modular edge computing device may be determined based on the ordinal position of the given modular edge computing device and the distance(s).

20 Claims, 5 Drawing Sheets

Related U.S. Application Data continuation of application No. 17/505,058, filed on Oct. 19, 2021, now Pat. No. 11,750,791.

(51) Int. Cl.

| | | |
|---|---|---|
| *A01B 76/00* | (2006.01) | |
| *A01B 79/00* | (2006.01) | |
| *G06T 7/73* | (2017.01) | |
| *G06T 7/80* | (2017.01) | |
| *H04N 13/246* | (2018.01) | |
| *H04N 13/296* | (2018.01) | |

(52) U.S. Cl.
CPC .................. *G06T 7/73* (2017.01); *G06T 7/85* (2017.01); *H04N 13/246* (2018.05); *H04N 13/296* (2018.05); *G06T 2207/30188* (2013.01); *G06T 2207/30204* (2013.01)

(58) Field of Classification Search
CPC ......... A01B 76/00; A01B 79/005; G06T 7/73; G06T 7/85; G06T 2207/30188; G06T 2207/30204; G06T 7/80
USPC .......................................................... 348/47
See application file for complete search history.

(56) References Cited

U.S. PATENT DOCUMENTS

| | | |
|---|---|---|
| 10,255,670 B1 | 4/2019 | Wu et al. |
| 10,499,037 B1 | 12/2019 | Wilcox |
| 11,315,258 B1 | 4/2022 | Anagnostopoulos |
| 2013/0229497 A1 | 9/2013 | Delacoux |
| 2020/0357138 A1 | 11/2020 | Xiang et al. |
| 2021/0185886 A1 | 6/2021 | Sibley et al. |
| 2021/0283642 A1 | 9/2021 | Smith |
| 2023/0047045 A1* | 2/2023 | Wieckhorst .......... A01B 59/066 |
| 2023/0120944 A1 | 4/2023 | Grant et al. |

OTHER PUBLICATIONS

Knorr et al., "Online Extrinsic Multi-Camera Calibration Using Ground Plane Induced Homographies" IEEE Intelligent Vehicles Symposium. Gold Coast, Australia. Dated Jun. 2013. pp. 236-241.

Lin et al., "Infrastructure-based Multi-Camera Calibration using Radial Projections" arXiv:2007.15330v2 [cs.CV] Dated Sep. 16, 2020. 17 pages.

Luck et al., "Potential for Pesticide and Nutrient Savings Via Map-Based Automatic Boom Section Control of Spray Nozzles" Computers and Electronics in Agriculture 70 (2010). pp. 19-26.

Mark Deutsch, "Impact of Boom Height Sensor Placement and Quantity on Boom Height Error" Iowa State University Digital Repository. Graduate Theses and Dissertations. 2020. 28 pages.

Thessler et al., "Geosensors to Support Crop Production: Current Applications and User Requirements" Sensors 2011, 11, 6656-6684; doi:10.3390/s110706656. ISSN 1424-8220. 29 pages.

Truong et al., "Automatic Multi-Camera Extrinsic Parameter Calibration Based on Pedestrian Torsors" Sensors 2019, 19. 4989; doi:10.3390/s19224989. www.mdpi.com/journal/sensors. Nov. 15, 2019. 26 pages.

Vellidis et al., "How Wireless Will Change Agriculture" Stafford, J.V. (Ed.), Precision Agriculture '07. Proceedings of the Sixth European Conference on Precision Agriculture (6ECPA), Skiathos, Greece, pp. 57-67.

Wei et al, "Extrinsic Parameters Calibration of Multi-Camera with Non-Overlapping Fields of View Using Laser Scanning" https://doi.org/10.1364/OE.27.016719. Dated May 31, 2019. 19 pages.

Yao et al., "Multi-Camera Positioning for Automated Tracking Systems in Dynamic Environments" International Journal of Information Acquisition. vol. 7, No. 3 (2010) 225-242. doi:10.1142/S0219878910002208. 19 pages.

United States Office Action, U.S. Appl. No. 17/505,058, Dec. 14, 2022, 20 pages.

\* cited by examiner

AUTOMATICALLY DETERMINING EXTRINSIC PARAMETERS OF MODULAR EDGE COMPUTING DEVICES

CROSS REFERENCE TO RELATED APPLICATIONS

This application is a continuation of U.S. application Ser. No. 18/223,859, filed Jul. 19, 2023, now U.S. Pat. No. 12,063,339, which application is a continuation of U.S. application Ser. No. 17/505,058, filed Oct. 19, 2021, now U.S. Pat. No. 11,750,791, which is incorporated by reference in its entirety.

BACKGROUND

Precision agriculture is becoming increasingly commonplace due to the advancement of various different technologies, such as agricultural robots and rovers, to name a few. These technologies enable the capture of enormous amounts of agricultural sensor data—particularly high-resolution imagery—at close range. These agricultural sensor data can then be processed to make a variety of different decisions on the scale of individual plants, or even constituent parts of plants. For example, high-resolution imagery may be processed using machine learning models to generate various agricultural inferences that can be the basis for targeted agricultural decision making.

One challenge with robots and rovers is scalability, e.g., due to their relatively high costs. Agricultural personnel may have little or no expertise in maintaining robots or rovers, which may be relatively sophisticated. Moreover, rovers may be constrained to static sensor placement, and hence, not easily adaptable to unpredictable or changing conditions often found in agricultural areas. It is possible to achieve a greater degree of flexibility by equipping conventional farm equipment such as tractors, booms, center pivots, etc., with sensor-equipped modular edge computing devices. However, positioning, commissioning, and/or calibrating (or recalibrating) these devices may be challenging for non-experts. Moreover, positions and/or orientations of sensor-equipped modular edge computing devices may be altered due to sudden movements attributable to unpredictable terrain.

SUMMARY

Implementations are described herein for automatic commissioning, configuration, calibration, and/or coordination of sensor-equipped modular edge computing devices (also referred to as "edge compute nodes" or "edge sensor packages") that are mountable on agricultural vehicles or parts of an agricultural vehicle such as tractors, boom, pivots, etc. More particularly, but not exclusively, techniques are described herein for automatically determining extrinsic parameters of modular edge computing devices and/or their sensors prior to, during, or subsequent to those modular devices being mounted on agricultural vehicles. As used herein, "extrinsic parameters" of a modular edge computing device refers to parameters related to a location and/or orientation of a modular edge computing device, e.g., relative to some reference point.

In some implementations, a method for automatically determining extrinsic parameters of a given modular edge computing device of a plurality of modular edge computing devices mounted on a vehicle may be implemented using one or more processors, e.g., of the modular edge computing device itself. The method may include: detecting, based on one or more sensor signals generated by one or more contactless sensors of the given modular edge computing device, one or more neighbor modular edge computing devices of the plurality of modular edge computing devices that are mounted on the vehicle nearest the given modular edge computing device; based the detected one or more neighbor modular edge computing devices, determining an ordinal position of the given modular edge computing device relative to the plurality of modular edge computing devices; determining, based on one or more of the sensor signals, one or more distances to the one or more neighbor modular edge computing devices; and determining the extrinsic parameters of the given modular edge computing device based on the ordinal position of the given modular edge computing device and the one or more distances.

In various implementations, one or more of the contactless sensors comprises a vision sensor. In various implementations, the sensor signal generated by the vision sensor is indicative of a fiducial marker on a surface of one or more of the neighbor modular edge computing devices. In various implementations, determining the one or more extrinsic parameters includes detecting an absolute orientation of the given modular edge computing device based on one or more of the sensor signals or one or more other sensor signals.

In various implementations, determining the one or more extrinsic parameters includes determining a relative orientation of the given modular edge computing device based on an observed orientation of one or more of the neighbor modular edge computing devices. In various implementations, the method may further include: generating one or more instructions to alter an orientation or position of the given modular edge computing device based on one or more of the extrinsic parameters; and causing output to be provided at one or more output devices, wherein the output conveys the one or more instructions.

In various implementations, the one or more distances are determined based on one or more time-of-flight sensor signals generated by one or more of the contactless sensors of the modular edge computing device. In various implementations, one or more of the contactless sensors comprises a laser. In various implementations, the vehicle comprises a tractor, and the plurality of modular edge computing devices are mounted along a boom affixed to the tractor. In various implementations, the vehicle comprises a center pivot, and the plurality of modular edge computing devices are mounted along the center pivot.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for automatic commissioning, configuration, calibration, and/or coordination of sensor-equipped modular edge computing devices (also referred to as "edge compute nodes" or "edge sensor packages") that are mountable on agricultural vehicles such as tractors, boom, pivots, etc. More particularly, but not exclusively, techniques are described herein for automatically determining extrinsic parameters of modular edge computing devices and/or their sensors prior to, during, or subsequent to those modular devices being mounted on agricultural vehicles. As used herein, "extrinsic parameters" of a modular edge computing device refers to parameters related to a location and/or orientation of a modular edge computing device, e.g., relative to some reference point.

A location of the modular edge computing device may be absolute and/or relative. For example, a plurality of modular edge computing devices may be mounted on a farm vehicle, e.g., along a longitudinal axis defined by a boom affixed to a tractor, or along a center pivot deployed in a field. Each modular edge computing device may have an absolute location that may be determined, for instance, using an integral global positioning system (GPS) sensor. Additionally or alternatively, each modular edge computing device may have a relative location compared to the other modular edge computing devices on the farm vehicle. This relative location may include, for instance, an ordinal position (e.g., 1st, 2nd, 3rd) of the modular edge computing device relative to the other modular edge computing devices and/or to some reference point or origin, and/or distances to other modular edge computing devices and/or to the reference point/origin.

An absolute and/or relative location of a given modular edge computing device may be determined based on one or more sensor signals generated by one or more contactless sensors of the given modular edge computing device. As mentioned previously, if the modular edge computing device includes an integral GPS sensor, that GPS signal may be used as its absolute position. But even if the modular edge computing device lacks a GPS sensor, its absolute position can be determined based on its distance to and/or relative position among other modular edge computing devices.

Various types of contactless sensors may be used to determine absolute and/or relative positions of modular edge computing devices. Two-dimensional (2D) and/or three-dimensional (3D) vision sensors (e.g., RGB, RGBd, stereoscopic, infrared, etc.) may visually determine a distance of a modular edge computing device to one or more other modular edge computing devices, such as one or more of its nearest neighbors. Wireless communication interfaces may also be used to determine an absolute and/or relative position of a modular edge computing device, e.g., using techniques such as wireless triangulation, time-of-flight (ToF), and so forth. Such wireless communication interfaces may utilize various wireless communication technologies, including but not limited to Wi-Fi, Bluetooth, various types of mesh networks (e.g., ZigBee, Z-Wave), visible light communication, and so forth.

To facilitate determination of extrinsic parameters visually, in some implementations, one or more of the modular edge computing devices may be equipped or include various types of fiducial markers. Some machine-readable fiducial markers such as bar codes, quick review (QR) codes, etc., may encode an identifier of a modular edge computing device, e.g., that distinguishes it from other modular edge computing devices. Other fiducial markers such as checkerboard patterns or scales may be used as points of reference and/or measure. For example, a first modular edge computing device may determine a distance to a neighbor modular edge computing device based on a known checkerboard or other spatial pattern included on a surface of the neighbor.

In some implementations, rather than determining extrinsic parameters based on direct observation of other modular edge computing devices, a modular edge computing device configured with selected aspects of the present disclosure may be configured to infer its extrinsic parameters based on overlapping sensor data. For example, if the fields of view (FOV) of two neighboring modular edge computing devices overlap, these overlapping areas and height estimation techniques can be used to determine the neighbors' relative positions and/or orientations. Various height estimation techniques may be used in some implementations, such as structure from motion (SfM), stereoscopic imaging, Light Detection and Ranging (LIDAR), and so forth.

An orientation of a modular computing device and/or of its integral sensors may also be absolute and/or relative. An absolute orientation may include a pose of the modular edge computing device and/or its sensor(s) relative to one or more axes. For instance, this pose may include a roll, a pitch, and/or a yaw of the modular edge computing device and/or of its sensor(s). An absolute orientation of a modular edge computing device and/or its sensors may be determined, for instance, using an integral inertial measurement unit (IMU), accelerometer(s), gyroscope(s), etc. A relative orientation of a modular edge computing device and/or its sensors may include its pose (e.g., roll, pitch, yaw) relative to other modular edge computing devices mounted on the same agricultural vehicle. A relative orientation of a modular edge computing device and/or its sensors may be determined, for instance, by visually observing an orientation of a neighbor modular edge computing device.

Once the extrinsic parameters of a modular edge computing device are known, those extrinsic parameters can be used for various purposes. Subsequent to mounting the modular edge computing device to an agricultural vehicle, the extrinsic parameters can be used to calibrate various sensors and/or agricultural tasks that are performed based on sensor signals generated by the various sensors. For example, one or more of the extrinsic parameters may be used to adjust one or more intrinsic parameters of a vision sensor that is intended to capture vision data of crops. The ordinal positions of the modular edge computing devices may be used to establish a daisy chain of communication and/or organization of the devices. For example, images captured by the modular edge computing devices may be stitched together in part based on their ordinal positions.

Extrinsics may also be used during installation/mounting. For example, a modular edge computing device may continuously and/or periodically perform techniques described herein to determine its real-time extrinsics while it is being installed. Based on those real time extrinsics (which may change frequently due to movement by installation personnel), as well as based on rules and/or best practices, instructions may be generated and conveyed to the installation personnel in real time, e.g., to help them mount the modular edge computing devices at optimal locations on the farm vehicle. For example, if it is intended that FOVs of neighboring modular edge computing devices overlap at least slightly, instructions may be sent to installation personnel to position and/or re-position the neighbor modular edge computing devices accordingly.

Additionally or alternatively, in some implementations, modular edge computing devices may be capable of self-adjustment. For example, a modular edge computing device may be mounted on part of an agricultural vehicle that is itself movable. For example, a modular edge computing device may be mounted on a movable chassis on a boom that is affixed to a tractor. In some such implementations, the modular edge computing device may be configured to control such a movable chassis itself, e.g., by performing techniques described herein to determine real-time extrinsics, and then to generate instructions that, when issued to the movable chassis, cause the chassis to readjust its position. In some implementations, the modular edge computing device may transmit such instructions wirelessly or over one or more wires to the agricultural vehicle.

In some implementations, a single absolute position may be used as an "origin" or "reference" point that is leveraged by a plurality of modular edge computing devices configured with selected aspects of the present disclosure. For example, one "reference" modular edge computing device may generate a GPS signal that establishes its own absolute position, and other modular edge computing devices may determine their positions relative to the reference modular computing device. In some cases, the reference modular computing device may be mounted at a particular position, such as at the center of a line of modular edge computing devices (e.g., on a tractor from which a boom extends from either side). In some implementations, the agricultural vehicle itself may be equipped with a GPS sensor that is used as a reference position from which modular edge computing devices determine their own relative positions, which in turn may enable them to determine their absolute positions.

Figure 1:
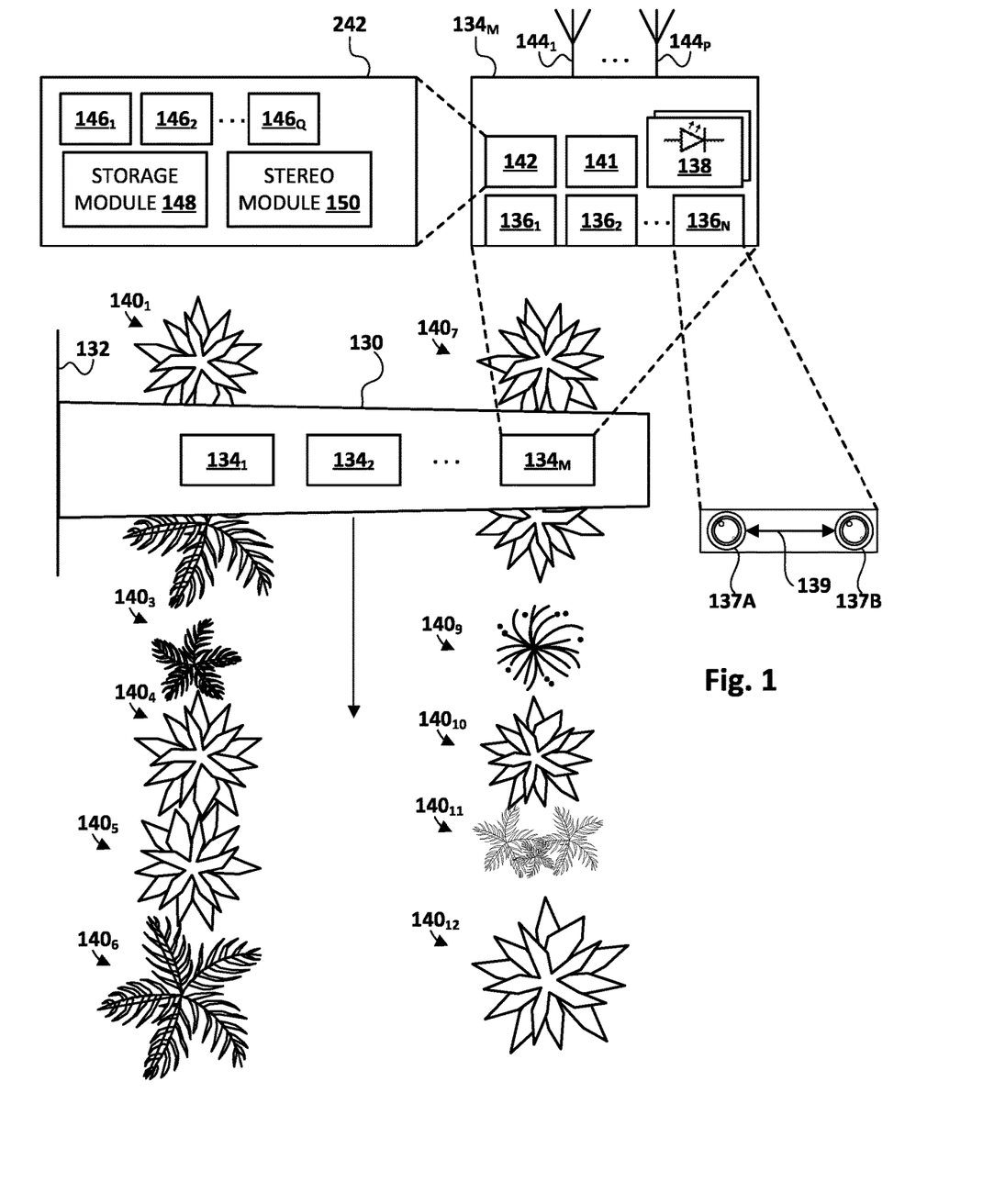
FIG. 1 schematically depicts an example environment in which disclosed techniques may be employed in accordance with various implementations.

FIG. 1 depicts an example field of plants $140_{1-12}$. A boom 130 mounted to a vehicle 132 (mostly not visible in FIG. 1, e.g., a tractor, a robot, a truck, etc.) is being carried over plants $140_{1-12}$ as shown by the arrow to gather sensor data. Boom 130 may include, for instance, sprinklers for irrigation, sprayers for chemical application, etc. Also mounted on boom 130 are a plurality of modular edge computing devices $134_{1-M}$ that are configured with selected aspects of the present disclosure. Although shown as boxes on top of boom 130 in FIG. 1, modular edge computing devices $134_{1-M}$ may alternatively be mounted at other locations of boom 130, such as on its sides or bottom. And while multiple modular edge computing devices $134_{1-M}$ are depicted in FIG. 1, any number of modular edge computing devices 134, such as a single modular edge computing device 134, may be deployed in similar fashions.

Modular edge computing devices $134_{1-M}$ are referred to as "modular" because they can be removably and flexibly mounted or secured to various different locations on various types of vehicles, such as tractors, pivots, trucks, robots, rovers, etc. Various mechanisms may be used to secure modular edge computing devices $134_{1-M}$ to vehicles, including but not limited to adhesives, adjustable clamps, straps, bolts, magnets, and so forth. In some implementations, the vehicles may include receiving portions (e.g., male or female) that are configured to securely receive corresponding portions of modular edge computing devices $134_{1-M}$ (e.g., male or female). Moreover, any number of modular edge computing devices $134_{1-M}$ may be mounted on a vehicle and may perform techniques described herein to be automatically commissioned, configured, calibrated, and/or coordinated with other similar devices.

Modular edge computing devices $134_{1-M}$ are referred to as "edge" computing devices because they are typically deployed near the "edge" of a distributed computing system that also includes "centralized" computing resources. In the agricultural context, the "edge" may include agricultural areas such as farms that are often rural and/or remote. Edge computing resources may be relatively resource-constrained, particularly in comparison to central computing resources. For example, edge computing resources may include modular edge computing devices 134 configured with aspects of the present disclosure, computing systems that are deployed at or near farms, client devices such as laptop computers and tablets, smart phones, and so forth.

The centralized computing resources, by contrast, may include server computing systems configured as a "cloud infrastructure" or simply the "cloud." Centralized computing resources may be virtually unlimited in terms of processing power, memory, etc. However, centralized computing resources may be geographically remote from the edge, resulting in delays between data being acquired at the edge and transferred (sometimes physically) to the centralized computing resources, and agricultural inferences being generated centrally. Accordingly, edge computing resources such as modular edge computing devices $134_{1-M}$ may be leveraged as much as possible to make decisions in real time or near real time, and more computationally complex but time-insensitive computations may be carried out at the centralized cloud.

As shown by the called-out window at top right, edge computing device 134M includes one or more sensors in the form of vision sensors $136_{1-N}$, one or more lights 138, a light controller 141, and logic 142 that is configured to carry out selected aspects of the present disclosure. Other edge computing devices may or may not be similarly configured. Vision sensors $136_{1-N}$ may take various forms, and may or may not be the same as each other. These forms may include, for instance, an RGB digital camera, an infrared camera, a 1.5D camera, a 3D camera, a light detection and ranging (LIDAR) sensor, and so forth. For example, vision sensor $136_N$ takes the form of a stereoscopic camera with two lenses 137A, 137B separated by an interaxial distance 139.

One or more of these vision sensors $136_{1-N}$ may capture images at various framerates (frames per second, or "FPS"), such as 30 FPS. In some implementations in which one or more of vision sensors $136_{1-N}$ captures 1.5D or 3D data, a point cloud having a resolution of, for instance, 640px×480px and/or a framerate of 10 FPS or greater may be implemented. In some implementations, vision sensor(s) 136 may capture 1D data and then generate 3D data (e.g., point clouds) using techniques such as structure from motion (SFM), stereo reconstruction, or dense optical flow 3D reconstruction, to name a few. In some implementations, one or more of vision sensors $136_{1-N}$ may be configured to capture vision data in a variety of different wavelengths, including but not limited to RGB, infrared, grayscale, X-ray, and so forth. While vision sensors $136_{1-N}$ are depicted pointed downward, this is not meant to be limiting, and they may be pointed in any direction, such as sideways.

Light(s) 138 and light controller 141 may be configured to illuminate plants 140, e.g., in sync with operation of vision sensors $136_{1-N}$, in order to ensure that the vision data that is captured is illuminated sufficiently so that it can be used to make accurate agricultural inferences. Light(s) 138 may take various forms, such as the light emitting diode (LED) depicted in FIG. 1, halogen lamps, incandescent lamps, infrared lamps, black lights, etc. In various implementations, light(s) 138 may be operated, e.g., by light controller 141, to emit various amounts and/or strengths of light (or more generally, electromagnetic radiation). For example, in some implementations, light(s) 138 may emit 14,000 lux of luminance or greater. In some such implementations, light controller 141 may also trigger vision sensors $136_{1-N}$ to acquire image data in sync with activation of light(s) 138.

Edge computing device 134M also includes one or more wireless antenna $144_{1-P}$. In some implementations, each wireless antenna 144 may be configured to transmit and/or receive different types of wireless data. For example, a first antenna $144_1$ may be configured to transmit and/or receive Global Navigation Satellite System (GNSS) wireless data, e.g., for purposes such as localization. Another antenna $144_P$ may be configured to transmit and/or receive IEEE 802.12 family of protocols (Wi-Fi) or Long-Term Evolution (LTE) data. Another antenna 144 may be configured to transmit and/or receive 5G data. Any number of antennas 144 may be provided to accommodate any number of wireless technologies.

In some implementations, a modular edge computing device 134 may be capable of localizing itself within agricultural field 112 using various technologies. For example, the GNSS antenna $144_1$ may interact with satellite(s) to obtain a position coordinate. However, as noted below, GNSS antenna $114_1$ may be limited in its accuracy. Accordingly, modular edge computing device 134 may use techniques described herein to localize itself relative to other edge computing devices. For example, modular edge computing device 134 may use techniques such as inertial measurement units (IMU) that are generated by, for instance, sensor(s) integral with wheels (not depicted) of vehicle 132, accelerometer(s), gyroscope(s), magnetometer(s), etc. In yet other implementations, wireless triangulation may be employed. In some implementations, edge computing device 134 may be capable of localizing itself with an accuracy of 10 cm or less, e.g., at a frequency of 10 Hz or greater (or an IMU frequency of 100 Hz or greater). And as described herein, each modular edge computing device 134 may be configured to localize itself and/or determine extrinsics of its sensor(s) relative to other modular edge computing devices mounted on the same vehicle.

Logic 142 may include various types of circuitry (e.g., processor(s), FPGA, ASIC) that is configured to carry out selected aspects of the present disclosure. For example, and as shown in the called-out window at top left in FIG. 1, logic 142 may include any number of tensor processing units (TPU) $146_{1-Q}$, a storage module 148, and a stereo module 150 (one or more graphical process units (GPU) and/or central processing units (CPU) may also be present, even if not depicted). In some implementations, four TPUs $146_{1-4}$ may be employed to process sensor data, e.g., in parallel, using four different machine learning models, e.g., at an inference frame rate per model of 10 FPS or greater.

Other configurations are possible. For example, instead of some number of TPUs, in some examples, an edge computing device 134 may include some number of GPUs, each with some number of cores. With the example operational parameters of edge computing device 134 described herein, in some examples, edge computing device 134 may be capable of being moved (or moving itself) at various speeds to perform its tasks, such as up to 12 m/s.

Storage module 148 may be configured to acquire and store, e.g., in various types of memories onboard edge computing device 134, sensor data acquired from one or more sensors (e.g., vision sensors $136_{1-N}$). In order to accommodate sensor input streams of, for instance, 1 GB/s, storage module 148 may, in some cases, initially write sensor data to a dedicated logical partition on a Non-Volatile Memory Express (NVMe) drive. Subsequently, e.g., after processing by inference module 116B, the sampled data may be copied to a Redundant Array of Inexpensive Disks (RAID) solid state drive for long-term storage. Stereo module 150 may be provided in some implementations in order to reconcile images captured by 1D vision sensors that are slightly offset from each other, and/or to generate 3D images and/or images with depth.

Figure 2:
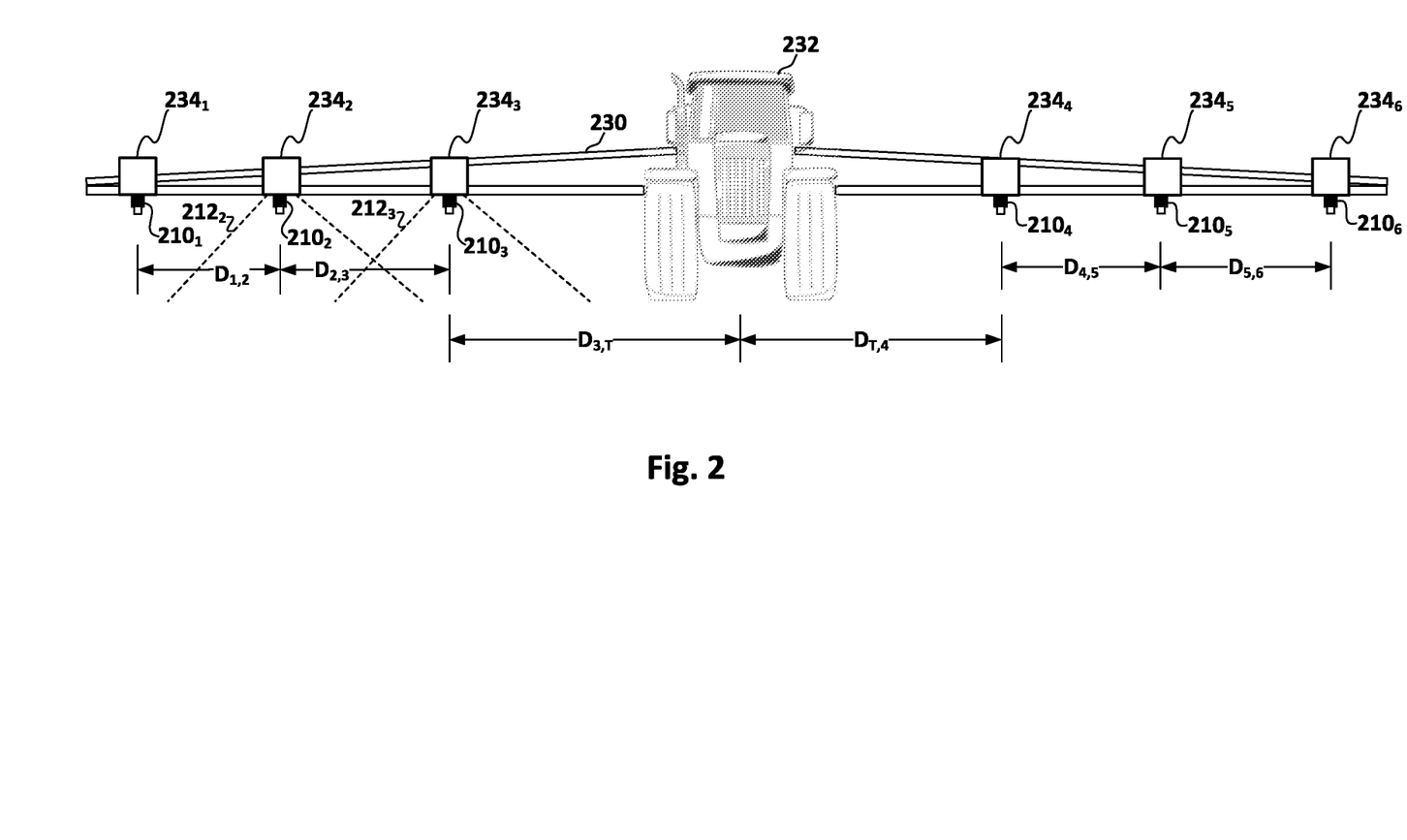
FIG. 2 depicts an example of how edge computing devices configured with selected aspects of the present disclosure may be deployed on an agricultural vehicle.

FIG. 2 depicts another example of how modular edge computing devices configured with selected aspects of the present disclosure may be deployed on a tractor 232 equipped with a boom sprayer 230. Boom sprayer 230 includes a plurality of nozzles $210_{1-6}$, three on one side of tractor 232 and three on the other. Also mounted on boom sprayer 230 are a plurality of modular edge computing devices $234_{1-6}$. In FIG. 2, there are equal numbers of nozzles $210_{1-6}$ and modular edge computing devices $234_{1-6}$, and they are spaced similarly across boom 230. This may be intentional, e.g., so that sensor readings acquired at modular edge computing devices $234_{1-6}$ may be used to make real-time operational adjustments to nozzles $210_{1-6}$. However, this is not required, and in other implementations modular edge computing devices $234_{1-6}$ may not coincide spatially with nozzles $210_{1-6}$ or other aspects of agricultural equipment.

In some implementations, modular edge computing devices $234_{1-6}$ may connect directly to and/or control operation of nozzles $210_{1-6}$. For example, as boom 230 moves up and down over rough terrain, accelerometers, gyroscopes, and/or other sensors integral with modular edge computing devices $234_{1-6}$ may detect this movement and adjust operation of nozzles $210_{1-6}$ accordingly, e.g., based on a current height and/or orientation of the given modular edge computing device 234 (and hence, the adjacent nozzle 210). For example, a nozzle 210 may be dynamically aimed towards the target (e.g., underlying crops) based on a sensed height and/or orientation of a modular edge computing device 234. Additionally or alternatively, the nozzle 210 may be selectively operated based on whether the modular edge computing device's height and/or orientation suggests that the nozzle 210 is currently pointed towards its target. These real-time adjustments may decrease waste of water and/or chemicals (e.g., fertilizer, pesticide, herbicide) and/or prevent application of water or chemicals to areas in which such application is not desired and/or could be harmful.

Although it is possible to equip each modular edge computing device 234 with GNSS or other similar technology to enable self-localization, this may increase cost, weight, size, and/or computational strain on these edge-computing resources. Moreover, many GNSS sensors may only be accurate to a certain degree, with more accurate sensors being more costly. Accordingly, in various implementations, each of modular edge computing devices $234_{1-6}$ may self-localize relative to others of modular edge computing devices $234_{1-6}$. In FIG. 2, for instance, tractor 232 may be equipped with a GNSS sensor (not depicted) that can be used as a reference or origin for the locations of modular edge computing devices $234_{1-6}$.

Each of modular edge computing device $234_{1-6}$ may be some relative distance(s) from its nearest neighbor(s). For example, first modular edge computing device $234_1$ is a distance $D_{1,2}$ from second modular edge computing device $234_2$. Second modular edge computing device $234_2$ is a distance $D_{2,3}$ from third modular edge computing device $234_3$. Third modular edge computing device $234_3$ is a distance $D_{3,T}$ from tractor 232 (T). Fourth modular edge computing device $234_4$ is a distance $D_{T,4}$ from tractor 232. Fifth modular edge computing device $234_5$ is a distance $D_{4,5}$ from fourth modular edge computing device $234_4$. And sixth modular edge computing device $234_6$ is a distance $D_{5,6}$ from fifth modular edge computing device $234_5$.

A modular edge computing device 234 may determine distance(s) to its nearest neighbors in various ways. In some implementations, the modular edge computing device 234 may exchange data with a neighbor wirelessly (e.g., using Bluetooth, Wi-Fi, ZigBee, Z-wave, RFID, NFC, etc.), and a ToF measurement taken during such communications may be used to determine physical distances to neighbor(s). Additionally or alternatively, in some implementations, each modular edge computing device 234 may include a fiducial marker with a known size or dimension, such as a checkerboard pattern. A neighbor may detect this fiducial marker, e.g., using a vision sensor 136, and may analyze the fiducial marker's size to calculate a distance to the modular edge computing device 234. The fiducial marker may also allow for modular edge computing devices 234 to detect each other's identifiers, which may be, for instance, strings or numbers and/or characters that are encoded into barcodes or QR codes, for instance.

In some implementations, modular edge computing devices $234_{1-6}$ may use overlapping fields of view of vision sensors (e.g., 134) to determine their distances to each other. For example, in FIG. 2, second modular edge computing device $234_2$ has a field of view $212_2$ and third modular edge computing device $234_3$ has a field of view $212_3$. As is evident from the dashed lines, these fields of view $212_{2-3}$ overlap. In various implementations, visual feature(s) detected in such an overlapping region, as well as depth measures or depth estimations (e.g., via SfM) may be used to determine the distance $D_{2,3}$ between modular edge computing devices $234_2$ and $234_3$. In some implementations, calculations akin to those employed for multiple lenses of stereoscopic cameras may be employed.

Once a given modular edge computing device 234 determines relative distance(s) to its neighbors, it can determine its absolute position relative to a reference or origin (tractor 232 in FIG. 2) based on those relative distances and the reference or origin. In FIG. 2, for instance, sixth modular edge computing device $234_6$ may determine its absolute position based at least in part on the sum of $D_{5,6}$, $D_{4,5}$, and $D_{T,4}$. In some implementations, sixth modular edge computing device $234_6$ may use other signals as well to determine its absolute position, such as an internal compass, accelerometer(s), IMU(s), wireless triangulation, etc. Other modular edge computing devices $234_{1-5}$ may determine their absolute positions relative to a reference or origin in similar fashions.

Figure 3:
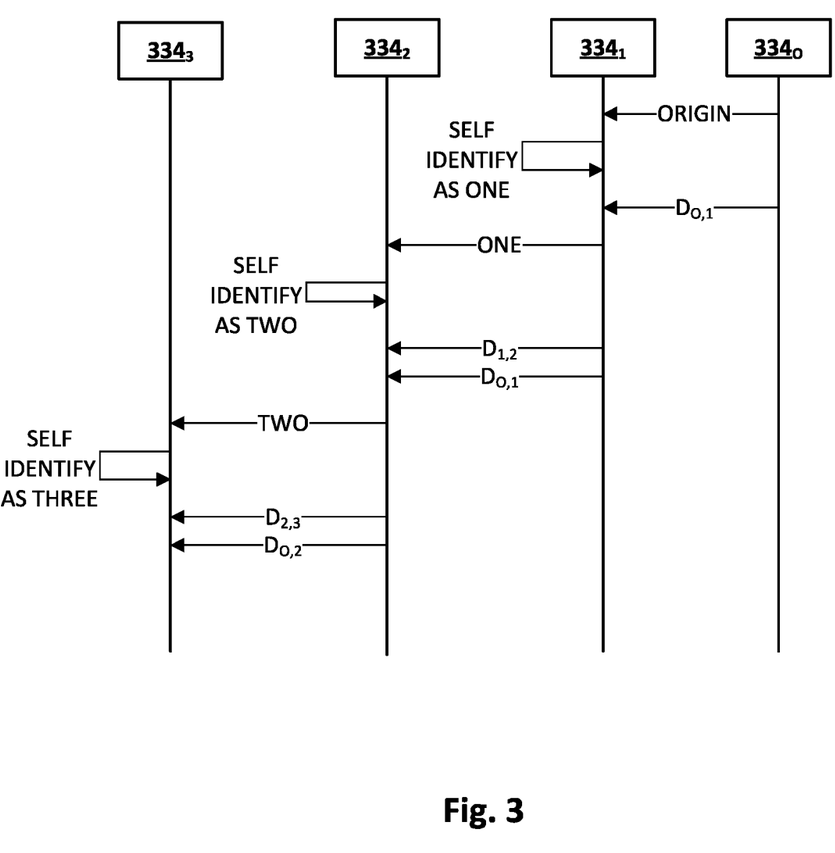
FIG. 3 schematically depicts examples of how techniques described herein may be implemented by modular edge computing devices.

FIG. 3 depicts an example of how multiple modular edge computing devices $334_{0-4}$ mounted on a vehicle may communicate and/or detect one another for localization and/or determination of sensor extrinsics. Starting at right, a first or "origin" modular edge computing device $334_0$ may actively or passively convey, to a neighboring modular edge computing device $334_1$, the fact that it is the origin (or reference) modular edge computing device (e.g., by virtue of being mounted at the center of a center pivot or on a tractor with a boom). Modular edge computing device $334_0$ may also passively or actively convey a distance $D_{0,1}$ between it and its neighbor, modular edge computing device $334_1$. Passive conveyance may be accomplished, for instance, by way of a fiducial marker printed, adhered, or otherwise disposed on a surface of modular edge computing device $334_0$, which is detected by modular edge computing device $334_1$. Active conveyance may be accomplished, for instance, using wireless communication.

Based on determining that its neighbor $334_0$ is the origin or reference, modular edge computing device $334_1$ may self-identify with the ordinal of "one" or "first" from the origin. Modular edge computing device $334_1$ may also determine its distance $D_{0,1}$ from the origin. Additionally, modular edge computing device $334_1$ may passively or actively convey its ordinal position (one) and/or a distance $D_{1,2}$ to another modular edge computing device $334_2$. In some implementations, modular edge computing device $334_1$ may also passively or actively convey its distance $D_{0,1}$ from the origin. With the distances $D_{1,2}$ and $D_{0,1}$, modular edge computing device $334_2$ may be able to determine its own distance to the origin. This process may continue as depicted in FIG. 3 until all modular edge computing devices $334_{0-3}$ have self-identified their ordinal positions and/or distances from each other and/or from the origin.

Figure 4:
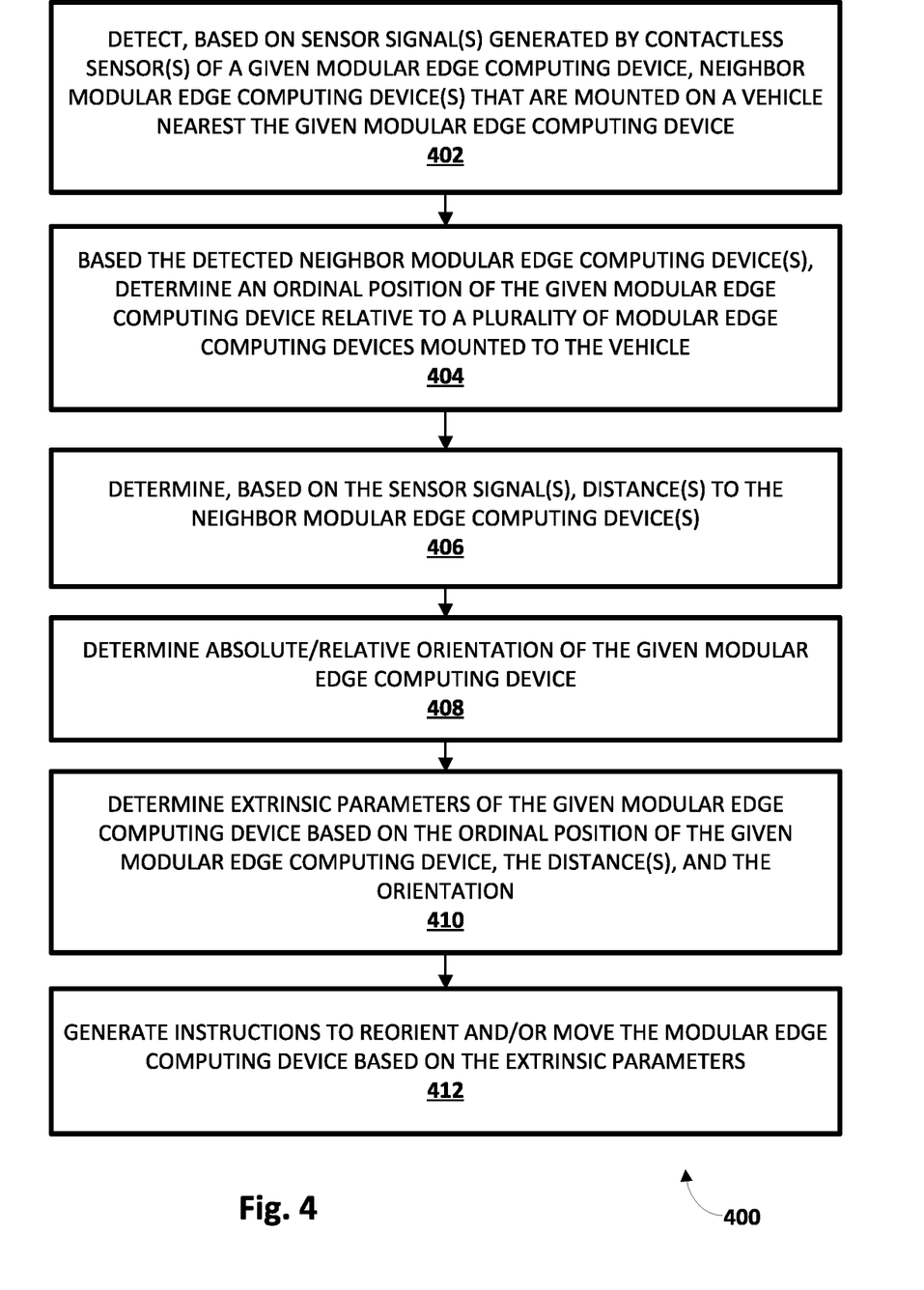
FIG. 4 is a flowchart of an example method in accordance with various implementations described herein.

FIG. 4 illustrates a flowchart of an example method 400 that may be implemented by a given modular edge computing device of a plurality of modular edge computing devices mounted to a vehicle. Other implementations may include additional operations than those illustrated in FIG. 4, may perform operation(s) of FIG. 4 in a different order and/or in parallel, and/or may omit one or more of the operations of FIG. 4.

At block 402, the given modular edge computing device (e.g., 134, 234, 334) may detect, based on one or more sensor signals generated by one or more contactless sensors of the given modular edge computing device, one or more neighbor modular edge computing devices of a plurality of modular edge computing devices that are mounted on a vehicle (e.g., 132, 232) nearest the given modular edge computing device. These contactless sensors may include, for instance, vision sensors 136, accelerometers, gyroscopes, wireless communication interfaces, and so forth.

Based on the detected one or more neighbor modular edge computing devices, at block 404, the modular edge computing device may determine its ordinal position relative to the plurality of modular edge computing devices. For example, where the plurality of modular edge computing devices are arranged on an axis along an agricultural vehicle as depicted in FIG. 3, each modular edge computing device may self-identify its ordinal position relative to the other modular edge computing devices and/or relative to some reference or origin.

At block 406, the modular edge computing device may determine, based on one or more of the sensor signals, one or more distances to the one or more neighbor modular edge computing devices. For example, the modular edge computing device may adjust a vision sensor to point laterally towards its neighbor(s), e.g., so that the vision sensor can capture vision data depicting the neighbor(s). Alternatively, the given modular edge computing device may be equipped with a side-facing vision sensor or a vision sensor with a field-of-view that is wide enough to capture at least a portion of its neighbors.

At block 408, the modular edge computing device may determine its absolute and/or relative orientation. For example, the modular edge computing device may be equipped with accelerometer(s), gyroscope(s), and/or inertial measurement units that can detect its absolute yaw, tilt, roll, pitch, etc. Additionally or alternatively, the modular edge computing device can detect its orientation relative to its neighbor(s), e.g., based on its absolute orientation and observed orientations and/or pose(s) of its neighbor(s) captured in vision data.

At block 410, the modular edge computing device may determine extrinsic parameters of the modular edge computing device and/or its sensor(s) based on the ordinal position of the modular edge computing device determined at block 404, the one or more distances determined at block 406, and/or the orientation determined at block 408.

In some implementations, based on the extrinsic parameters determined at blocks 404-410, at block 412, the modular edge computing device may generate, or cause to be generated, instructions to reorient and/or move the modular edge computing device. For example, audio and/or visual output may be provided at one or more speakers of the modular edge computing device (or another computing device connected thereto) that instruct the user to move and/or reorient the modular edge computing device to comport with some desired, approved, and/or pretested configuration. When the modular edge computing device is at an appropriate orientation and/or position relative to other modular edge computing devices, the user may be instructed to secure the modular edge computing device at that position. For example, when a field-of-view of a vision sensor (136) of a first modular edge computing device sufficiently overlaps with a field-of-view of a vision sensor of a second, neighbor modular edge computing device, the user may be instructed to secure the first modular edge computing device in place.

In other implementations, the modular edge computing devices and/or the vehicles they are mounted on may include mechanical mechanisms such as pistons, chassis, motors, joints, actuators, etc. that may enable the modular computing devices to reorient and/or move themselves in response to extrinsic parameters determined at blocks 404-410. For example, a modular edge computing device may determine its extrinsic parameters, generate instructions for readjusting one or more actuators or joints of an agricultural vehicle (or a part mounted on the vehicle), and issue those instructions to the vehicle or to another remote device that is capable of controlling the vehicle.

Figure 5:
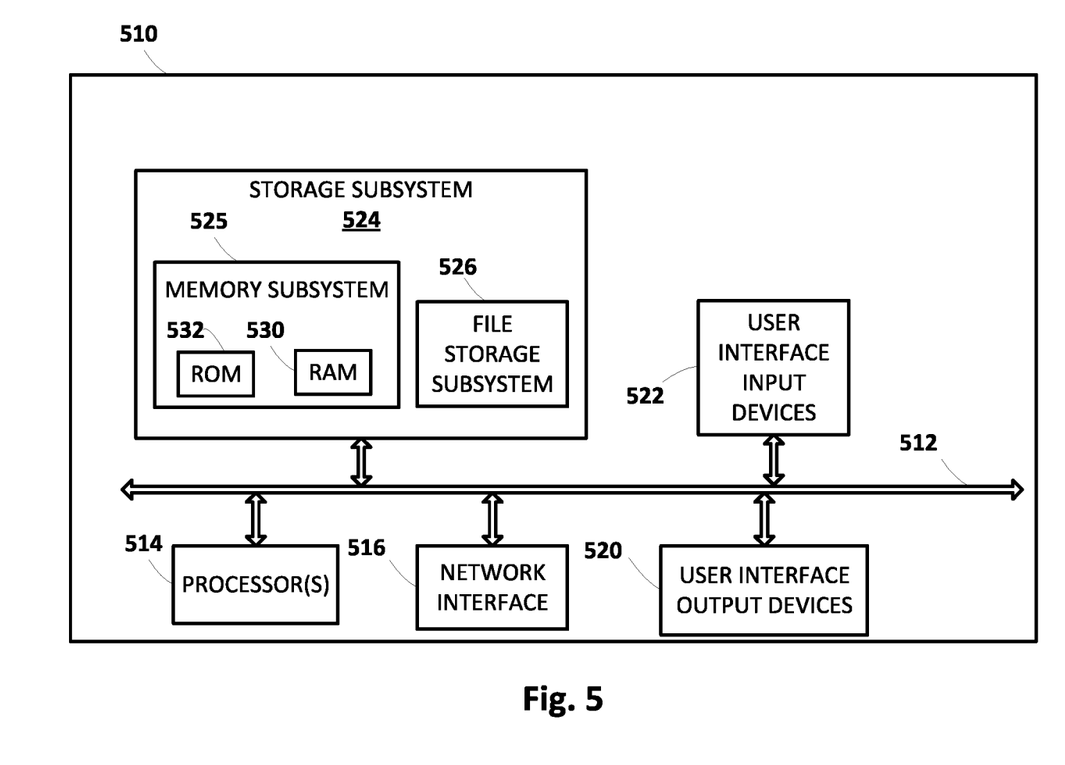
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices or haptic feedback devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method 400 described herein, as well as to implement various components depicted in FIGS. 1-3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for automatically determining extrinsic parameters of a first edge computing device of a plurality of edge computing devices in an agricultural environment, the method comprising:
    detecting, using signals by generated by one or more sensors of the first edge computing device, a second edge computing device of the plurality of edge computing devices near the first edge computing device;
    determining, based on the detected second edge computing device, an ordinal position of the first edge computing device relative to the second edge computing device;
    determining, based on visual signals generated by a visual sensor of the first edge computing device, a distance to the second edge computing device; and
    determining the extrinsic parameters of the first edge computing device based on the ordinal position of the first edge computing device and the distance to the second edge computing device.

2. The method of claim 1, wherein detecting the second edge computing device further comprises:
    receiving, from the second edge computing device, a wireless communication comprising position and distance information.

3. The method of claim 2, wherein determining the ordinal position of the first edge computing device is additionally based on the wirelessly received position and distance information.

4. The method of claim 2, wherein determining the distance to the second edge computing device based on visual signals generated by the visual sensor of the first edge computing device is additionally based on the wirelessly received position and distance information.

5. The method of claim 1, further comprising:
    receiving, from a server computing system, an agricultural inference about the agricultural environment; and
    wherein automatically determining the extrinsic parameters of the first edge computing device occurs on a local system in response to receiving the agricultural inference.

6. The method of claim 1, wherein determining the distance to the second edge computing device based on visual signals generated by the visual sensor of the first edge computing device comprises:
    identifying at least one visual features detected in a first region of a first image captured by the visual sensor of the first edge computing device that is the same as one or more visual features detected in a second region of a second image captured by a visual sensor of the second edge computing device; and
    determining the distance to the second edge computing device based on the at least one visual feature that is the same between the first image and the second image.

7. The method of claim 1, wherein determining the ordinal position of the first edge computing device comprises:
    identifying a visual feature detected in a first image captured by the visual sensor of the first edge computing device representing the second edge computing device; and
    determining the ordinal position of first edge computing device based on the identified visual feature.

8. The method of claim 1, wherein the first edge computing device is mounted to an agricultural robot operating in the agricultural environment.

9. The method of claim 1, wherein the second edge computing device is mounted to an agricultural vehicle operating in the agricultural environment.

10. The method of claim 9, wherein the second edge computing device is removably couplable from the agricultural vehicle.

11. A non-transitory computer-readable storage medium storing computer program instructions for automatically determining extrinsic parameters of a first edge computing device of a plurality of edge computing devices in an agricultural environment, the computer program instructions, when executed by one or more processors, causing the one or more processors to:
    detect, using signals by generated by one sensors of the first edge computing device, a second edge computing device of the plurality of edge computing devices near the first edge computing device;
    determine, based on the detected second edge computing device, an ordinal position of the first edge computing device relative to the second edge computing device;
    determine, based on visual signals generated by a visual sensor of the first edge computing device, a distance to the second edge computing device; and
    determine the extrinsic parameters of the first edge computing device based on the ordinal position of the first edge computing device and the distance to the second edge computing device.

12. The non-transitory computer-readable storage medium of claim 11, wherein detecting the second edge computing device causes the one or more processors to:
    receive, from the second edge computing device, a wireless communication comprising position and distance information.

13. The non-transitory computer-readable storage medium of claim 12, wherein determining the ordinal position of the first edge computing device is additionally based on the wirelessly received position and distance information.

14. The non-transitory computer-readable storage medium of claim 12, wherein determining the distance to the second edge computing device based on visual signals generated by the visual sensor of the first edge computing device is additionally based on the wirelessly received position and distance information.

15. The non-transitory computer-readable storage medium of claim 11, wherein executing the computer program instructions further cause the one or more processors to:
  receive, from a server computing system, an agricultural inference about the agricultural environment; and
  wherein automatically determining the extrinsic parameters of the first edge computing device occurs on a local system in response to receiving the agricultural inference.

16. The non-transitory computer-readable storage medium of claim 11, wherein determining the distance to the second edge computing device based on visual signals generated by the visual sensor of the first edge computing device causes the one or more processors to:
  identify at least one visual features detected in a first region of a first image captured by the visual sensor of the first edge computing device that is the same as one or more visual features detected in a second region of a second image captured by a visual sensor of the second edge computing device; and
  determine the distance to the second edge computing device based on the at least one visual feature that is the same between the first image and the second image.

17. The non-transitory computer-readable storage medium of claim 11, wherein determining the ordinal position of the first edge computing device causes the one or more processors to:
  identify a visual feature detected in a first image captured by the visual sensor of the first edge computing device representing the second edge computing device; and
  determine the ordinal position of the first edge computing device based on the identified visual feature.

18. The non-transitory computer-readable storage medium of claim 11, wherein the first edge computing device is mounted to an agricultural robot operating in the agricultural environment.

19. The non-transitory computer-readable storage medium of claim 11, wherein the second edge computing device is mounted to an agricultural vehicle operating in the agricultural environment.

20. An agriculture robot comprising:
  one or more sensors configured to generate signals representing position and location information in an agricultural environment;
  a visual sensor configured to capture images of the agricultural environment;
  a first edge computing device of a plurality of edge computing devices in the agricultural environment;
  one or more processors; and
  a non-transitory computer-readable storing medium storing computer program instructions for automatically determining extrinsic parameters of the first edge computing device of a plurality of edge computing devices, the computer program instructions, when executed by the one or more processors, causing the one or more processors to:
    detect, using signals by generated by the one sensors, a second edge computing device near the first edge computing device;
    determine, based on the detected second edge computing device, an ordinal position of the first edge computing device relative to the second edge computing device;
    determine, based on visual signals generated by a visual sensor of the first edge computing device, a distance to the second edge computing device; and
    determine the extrinsic parameters of the first edge computing device based on the ordinal position of the first edge computing device and the distance to the second edge computing device.

* * * * *